(12) United States Patent
Zou et al.

(10) Patent No.: US 10,186,066 B2
(45) Date of Patent: Jan. 22, 2019

(54) METHOD, DEVICE AND STORAGE MEDIUM FOR IMAGE SYNTHESIS

(71) Applicant: NUBIA TECHNOLOGY CO., LTD., Shenzhen, Guangdong (CN)

(72) Inventors: Mingshuang Zou, Shenzhen (CN); Qiang Li, Shenzhen (CN); Lei Miao, Shenzhen (CN); Xiaohui Cui, Shenzhen (CN); Yuxing Wei, Shenzhen (CN)

(73) Assignee: Nubia Technology Co., Ltd. (CN)

( * ) Notice: Subject to any disclaimer, the term of this patent is extended or adjusted under 35 U.S.C. 154(b) by 33 days.

(21) Appl. No.: 15/329,224

(22) PCT Filed: Jun. 30, 2015

(86) PCT No.: PCT/CN2015/082988
§ 371 (c)(1),
(2) Date: Jan. 25, 2017

(87) PCT Pub. No.: WO2016/019770
PCT Pub. Date: Feb. 11, 2016

(65) Prior Publication Data
US 2017/0213371 A1    Jul. 27, 2017

(30) Foreign Application Priority Data
Aug. 6, 2014   (CN) .......................... 2014 1 0385239

(51) Int. Cl.
*G06T 11/60* (2006.01)
*G06T 7/20* (2017.01)
(Continued)

(52) U.S. Cl.
CPC ................ *G06T 11/60* (2013.01); *G06T 7/20* (2013.01); *G06T 11/00* (2013.01); *H04N 5/2351* (2013.01);
(Continued)

(58) Field of Classification Search
CPC ......... G06T 11/60; G06T 7/20; H04N 5/2351; H04N 5/23229; H04N 5/2625
See application file for complete search history.

(56) References Cited

U.S. PATENT DOCUMENTS 9,070,230 B2 * 6/2015 Wilensky ................ G06T 11/60
9,813,638 B2 * 11/2017 Warnberg ............ H04N 5/2621
(Continued)

FOREIGN PATENT DOCUMENTS

| CN | 103177469 A | 6/2013 |
| CN | 103327253 A | 9/2013 |
| CN | 104134225 A | 11/2014 |

OTHER PUBLICATIONS

International Search Report in international application No. PCT/CN2015/082988, dated Sep. 2, 2015, 2 pages.
(Continued)

*Primary Examiner* — Nicholas G Giles
(74) *Attorney, Agent, or Firm* — Eric L. Sophir; Dentons US LLP

(57) ABSTRACT

A method, a device and a computer storage medium for image synthesis. The method for image synthesis includes: getting a default image, setting the default image to the background image of shooting; shooting the trajectory of moving objects; at the end of the shooting, synthesizing images of the trajectory of moving objects shot currently and the background image to generate a target image.

17 Claims, 5 Drawing Sheets

(51) Int. Cl.
*G06T 11/00* (2006.01)
*H04N 5/232* (2006.01)
*H04N 5/235* (2006.01)
*H04N 5/262* (2006.01)

(52) U.S. Cl.
CPC ....... *H04N 5/23229* (2013.01); *H04N 5/2621* (2013.01); *H04N 5/2625* (2013.01); *G06T 2207/20172* (2013.01)

(56) References Cited

U.S. PATENT DOCUMENTS

| | | | |
|---|---|---|---|
| 9,819,876 B2 * | 11/2017 | Yamamoto | H04N 5/2621 |
| 2004/0125115 A1 * | 7/2004 | Takeshima | G06T 13/80 |
| | | | 345/634 |
| 2007/0009028 A1 | 1/2007 | Lee | |
| 2007/0031062 A1 * | 2/2007 | Pal | G06F 17/30843 |
| | | | 382/284 |
| 2013/0242121 A1 | 9/2013 | Kashiwagi et al. | |
| 2014/0347519 A1 * | 11/2014 | Yamamoto | H04N 5/235 |
| | | | 348/231.99 |
| 2015/0042832 A1 * | 2/2015 | Warnberg | H04N 5/2621 |
| | | | 348/218.1 |
| 2015/0042849 A1 * | 2/2015 | Negishi | H04N 5/2356 |
| | | | 348/251 |
| 2015/0139495 A1 * | 5/2015 | Sohn | H04N 5/265 |
| | | | 382/103 |
| 2015/0229823 A1 * | 8/2015 | Yasutomi | G09G 5/393 |
| | | | 348/216.1 |
| 2018/0041717 A1 * | 2/2018 | Yamamoto | H04N 5/265 |

OTHER PUBLICATIONS

English Translation of the Written Opinion of the International Search Authority in international application No. PCT/CN2015/082988, dated Sep. 2, 2015, 6 pages.

International Search Report issued in International Application No. PCT/CN2015/08988 dated Sep. 2, 2015, with English Translation.

\* cited by examiner

METHOD, DEVICE AND STORAGE MEDIUM FOR IMAGE SYNTHESIS

CROSS-REFERENCE TO RELATED APPLICATIONS

This application is national stage of PCT/CN2015/082988, filed Jun. 30, 2015, which claims priority to Chinese Patent Application No. 201410385239.5, filed Aug. 6, 2014, all of which are incorporated by reference in their entirety.

TECHNICAL FIELD

The disclosure relates to the field of image processing, and in particular to a method, apparatus, and a computer storage medium for image composition.

BACKGROUND

Star trail shooting is mainly used for shooting starlight in a starry sky. It is a very important experience for photographers to shoot the star trail. Currently, in a process of shooting the image of the star trail, the shot image of the starry sky is usually taken as a shooting background image. Such a shooting background image is relatively dull, and diversified demands for the shooting background images of the images of the star trails cannot be met, such that the experience of the star trail shooting is deteriorated.

SUMMARY

To solve the existing technical problems, the embodiments of the disclosure are intended to provide a method and apparatus, and a computer storage medium for image composition, that at least solve the problems that diversified demands for shooting background images of images cannot be met and the experience of image shooting is deteriorated.

An image composition method provided by an embodiment of the disclosure may include:

a preset image is acquired, and the preset image is set as a shooting background image;

a moving object is shot;

when shooting is ended, the shot current trail image of the moving object is composited with the background image to generate a target image.

In the solution, the step that the moving object is shot may include:

when a first image is shot, the first image is taken as a first composite trail image of the moving object;

after the first image is shot, an image is shot at a preset time interval, and every time the image is shot, the shot current image is composited with a previous composite trail image of the moving object so as to generate a new trail image of the moving object;

when shooting is ended, a generated new trail image is composited with the background image to generate the target image.

In the solution, after the generated new trail image of the moving object is composited with the background image to generate the target image, the method may further include:

a luminance value of the background image in the target image is restored to an unadjusted luminance value.

In the solution, after the generated new trail image of the moving object is composited with the background image to generate the target image, the method may further include:

a transparency of the background image and/or a transparency the trail image of the moving object in the target image is adjusted.

In the solution, when the shot image is an image of a star trail, the step that the shot current trail image of the moving object is composited with the previous composite trail image of the moving object so as to generate the new trail image of the moving object may include:

it is judged whether the luminance of a pixel in the shot current trail image of the moving object is greater than the luminance of a pixel, which is at the same position as the position of the pixel in the shot current trail image, in the previous composite trail image of the moving object; and if the luminance of the pixel in the shot current trail image of the moving object is greater than the luminance of the pixel, which is at the same position as the position of the shot current trail image, in the previous composite trail image of the moving object, the pixel in the previous composite trail image of the moving object is replaced with the pixel, which is at the same position as the position of the pixel in the previous composite trail image, in the shot current trail image of the moving object.

In the solution, when the shot image is a light-painting image, the step that the shot current trail image of the moving object is composited with the previous composite trail image of the moving object so as to generate the new trail image of the moving object may include:

an addition operation is performed on the shot current trail image of the moving object and the previous composite trail image of the moving object to generate the new trail image of the moving object.

In the solution, when the shot image is a nebula image, shooting may be performed after a certain duration of exposure, so as to obtain the nebula image.

In the solution, the step that the preset image is set as the shooting background image may include:

a luminance value of the preset image is acquired, and it is judged whether the luminance value is greater than a preset luminance threshold; and when the luminance value is smaller than or equal to the preset luminance threshold, the preset image is set as the shooting background image.

In the solution, the method may further include:

when the luminance value of the preset image is greater than the preset luminance threshold, the luminance of the preset image is adjusted so as to adjust the luminance value of the preset image to be smaller than or equal to the preset luminance threshold; and the luminance-adjusted preset image is set as the shooting background image.

An embodiment of the disclosure also provides an image composition apparatus, which may include:

a processing module, configured to acquire a preset image, and set the preset image as a shooting background image;

a shooting module, configured to shoot a moving object; and a composition module, configured to composite, when shooting is ended, the shot current trail image of the moving object with the background image to generate a target image.

In the solution, the processing module may be further configured to take, when a first image is shot, the first image as a first composite trail image of the moving object;

the shooting module may be further configured to shoot, after the first image is shot, an image at a preset time interval; and the composition module may be configured to composite, every time the image is shot, the shot current image with a previous composite trail image of the moving object so as to generate a new trail image of the moving object, and composite, when shooting is ended, a generated new trail image of the moving object with the background image to generate the target image.

In the solution, the processing module may be further configured to restore a luminance value of the background image in the target image to an unadjusted luminance value.

In the solution, the processing module may be further configured to adjust a transparency of the background image and/or a transparency of the trail image of the moving object in the target image.

In the solution, when the shot image is an image of a star trail, the image composition apparatus may further include a judgement module, configured to judge whether the luminance of a pixel in the shot current trail image of the moving object is greater than the luminance of a pixel, which is at the same position as the position of the pixel in the shot current trail image, in the previous composite trail image of the moving object; and the composition module may be further configured to replace, if the luminance of the pixel in the shot current trail image of the moving object is greater than the luminance of the pixel, which is at the same position as the position of the pixel in the shot current trail image, in the previous composite trail image of the moving object, the pixel in the previous composite trail image of the moving object with the pixel, which is at the same position as the position of the pixel in the previous composite trail image, in the shot current trail image of the moving object.

In the solution, when the shot image is a light-painting image, the composition module may be further configured to perform an addition operation on the shot current trail image of the moving object and the previous composite trail image of the moving object to generate the new trail image of the moving object.

In the solution, the processing module may be further configured to acquire a luminance value of the preset image;

the judgement module may be further configured to judge whether the luminance value is greater than a preset luminance threshold;

the processing module may be further configured to set, when the luminance value is smaller than or equal to the preset luminance threshold, the preset image as the shooting background image; and the processing module may be further configured to adjust, when the luminance value of the preset image is greater than the preset luminance threshold, the luminance of the preset image so as to adjust the luminance value of the preset image to be smaller than or equal to the preset luminance threshold, and set the luminance-adjusted preset image as the shooting background image.

An embodiment of the disclosure also provides a computer storage medium having stored therein computer executable instructions for executing the image composition method.

The embodiments of the disclosure provide the method, apparatus, and the computer storage medium for the image composition. A preset image is acquired and taken as a background image for image shooting, and when shooting is ended, the shot current image is composited with an image serving as a shooting background image to generate a target image. An image can be selected as a shooting background image, diversified demands for shooting background images of images are met, and the experience of image shooting is improved.

The implementation of the aim, the functional features and advantages of the disclosure will be further illustrated with reference to the drawings in conjunction with embodiments.

DETAILED DESCRIPTION

It will be understood that specific embodiments described herein are only intended to explain the disclosure and are not intended to limit the disclosure.

Figure 1:
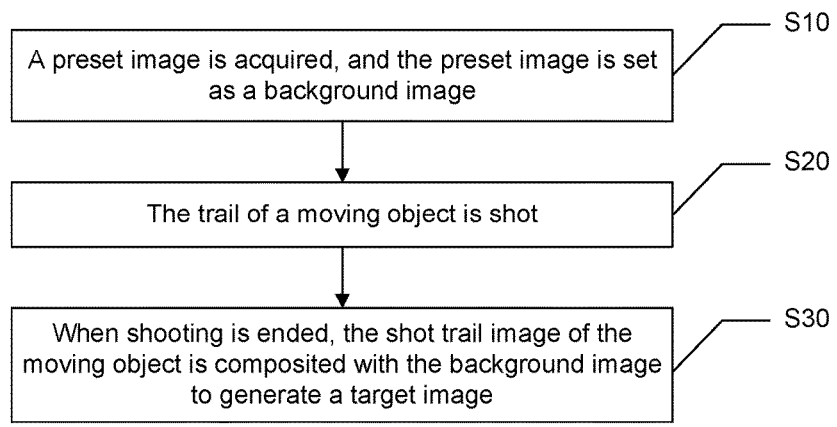
FIG. 1 is a flowchart of a first embodiment for an image composition method according to the disclosure.

An embodiment of the disclosure provides an image composition method. Reference is made to FIG. 1 which is a flowchart of a first embodiment for an image composition method according to the disclosure.

In one embodiment, the image composition method includes the steps as follows.

In Step S10, a preset image is acquired, and the preset image is set as a shooting background image.

In the present embodiment, when an image shooting instruction is received or before an image is shot, the preset image is acquired. The process of acquiring the preset image may include: receiving an image input instruction, and taking an image corresponding to the image input instruction as the preset image. Alternatively, the process of acquiring the preset image may include: receiving an image selection instruction, and selecting a corresponding image from pre-stored images according to a selection instruction. The corresponding image will be taken as the preset image. Alternatively, the process of acquiring the preset image may include: receiving an image acquisition instruction, randomly selecting, as the preset image, an image from the pre-stored images, or selecting, as the preset image, an image meeting a preset selection condition from the pre-stored images. The preset selection condition refers to that the view count of the pre-stored images exceeds a preset view count threshold (for example, 3, 5 or the like), or an interval between storage time of the pre-stored images and current time is smaller than a preset time threshold (for example, one day, 20 hours or the like). The preset images may be image-processed images, for example, figures and/or scenes extracted from an image, or may be unprocessed original images such as images from which figures and/or scenes are not extracted. After the preset image is acquired, the preset image is set as a shooting background image (i.e., background image). In other embodiments of the disclosure, in order to make image shooting better meet expectations of people, a preset image may be acquired, figures and/or scenes are extracted from the preset image, and the extracted figures and/or scenes serve as a shooting background image. An executive subject for the image composition method may be a mobile photographic device such as a mobile phone, a pad and a notebook computer. The mobile phone is preferred in the present embodiment.

In Step S20, the trail of a moving object is shot.

In Step S30, when shooting is ended, the shot current trail image of the moving object is composited with the background image to generate a target image.

During shooting of the moving object, when a first image is shot, the first image is taken as a first composite trail image of the moving object. After the first image is shot, an image is shot at a preset time interval, and every time the image is shot, the shot current image is composited with a previous composite trail image of the moving object so as to generate a new trail image of the moving object. When shooting is ended, the shot trail image of the moving object is composited with the background image to generate the target image.

After the preset image is set as the shooting background image, immediately or after a certain time interval (30 s, one minute or the like), or when the image shooting instruction is received, the first image is shot. When the first image is shot, the first image is taken as the composited first trail image of the moving object. Before the image is shot, the position of an image shooting apparatus may be adjusted, in order to make a shot target in the shot image located at an expected position of the background image. In other embodiments of the disclosure, in order to enable a user to better view each image, the background image may be composited with the corresponding shot trail image of the moving object to obtain a target image, thereby improving the user experience.

After the first image is shot, an image is shot at a preset time interval. Every time the image is shot, the shot current image is composited with a previous composite trail image of the moving object so as to generate a new trail image of the moving object. That is, when the first image is shot, the first image is taken as the composited first trail image of the moving object. After a preset time interval, a second image is shot. When the second image is shot, the second image is composited with the first image so as to generate a new trail image of the moving object. After a preset time interval, a third image is shot. When the third image is shot, the third image is composited with the composited second trail image of the moving object so as to generate a new trail image of the moving object. In such way, an image composited at each time is taken as a new trail image of the moving object, such that when next image is shot, the image composited at each time is composited with a next image to generate the new trail image of the moving object. The preset time is exposure time, namely exposure time required for image shooting, for example, 120 s, 200 s or the like.

The target image is formed by combining the trails of identical shot targets in images shot at different moments. When an image shooting ending instruction is received, or when preset shooting time (two hours, four hours or the like) is up, image shooting stops. When shooting is ended, the shot current trail image of the moving object and the background image are acquired. The acquired shot current trail image of the moving object and the background image are composited to generate a target image. That is, the shot current trail image of the moving object and the background image image are composited, so as to display the trail image of the moving object on the background image.

For example, in case of composition of a light-painting image, the process of compositing the shot current trail image of the moving object with the previous composite trail image of the moving object so as to generate the new trail image of the moving object may include: performing an addition operation on the shot current trail image of the moving object and the previous composite trail image of the moving object to generate the new trail image of the moving object, that is, superposing pixels in the previous composite trail image of the moving object and pixels in a shot current starry sky image to generate a composited light-painting image. Since image data is collected at a preset exposure time interval, composite images are discontinuously generated.

Preferably, a set of pixels meeting a preset condition are selected from the previous composite trail image of the moving object and a set of pixels meeting a preset condition are selected from the shot current starry sky image, and then an addition operation is performed on the two sets of pixels.

Specifically, in some embodiments, when judging whether a certain pixel meets the preset condition, it may be directly judged whether a luminance parameter of the pixel is greater than a threshold. If the luminance parameter of the pixel is greater than the threshold, it is judged that the pixel meets the preset condition. After the set of pixels having luminance parameters greater than the threshold (that is, an absolute value of the luminance of a certain point on an image is greater than the threshold) are selected from the previous composite trail image of the moving object and the set of pixels having luminance parameters greater than the threshold are selected from the shot current starry sky image, an addition operation is performed only on the two sets of pixels meeting the preset condition, thereby filtering pixels having lower luminance to a certain extent, and preventing a final composited light-painting image from being polluted by an accumulation effect of ambient light. The magnitude of the threshold may be determined according to the average luminance of the image. The luminance parameter is an optical parameter such as an RGB value, a YUV value or the like.

For example, the image includes n pixel units, namely a pixel unit 1, a pixel unit 2, . . . , a pixel unit n. Pixel parameters of the pixel unit 101 to the pixel unit 200 in the previous composite trail image of the moving object are greater than the threshold, and luminance parameters of the pixel unit 1 to the pixel unit 100 in the shot current starry image are greater than the threshold. Thus, an addition operation is performed on the pixel parameters of the pixel unit 1 to the pixel unit 200 in the previous composite trail image of the moving object and the shot current starry sky image. It is assumed that the luminance parameter value of the pixel unit 1 in a current image to be composited is 10 and the luminance parameter value of the pixel unit 1 in the shot current starry sky image is 100. The luminance parameter value of the pixel unit 1 in a composite light-painting image (i.e., new trail image of the moving object) after addition will be 100+10=110. Besides, noise reduction is performed on the composite light-painting image, and a composition proportion of a new composite light-painting image is controlled according to the exposure of the existing image, thereby inhibiting over-exposure.

For example, in case of composition of a target star trail image, the process of compositing the shot current trail image of the moving object with the previous composite trail image of the moving object so as to generate the new trail image of the moving object may include: acquiring pixels at the same position and at different time, judging whether the luminance of a pixel in the shot current trail image of the moving object is greater than the luminance of a pixel in the previous composite trail image of the moving object, and if the luminance of a pixel in the shot current trail image of the moving object is greater than the luminance of a pixel in the previous composite trail image of the moving object, replacing the pixel in the previous composite trail image of the moving object with a pixel in the shot current starry sky image. After all of the pixels having smaller luminance in the previous composite trail image of the moving object are replaced, a new star trail image is finally composited. That is, the star trail image composition of the present embodiment is performed in a luminance selection mode. An image of a star trail that has been composited serves as the previous composite trail image of the moving object, and a composition method is selected for replacing pixels in the previous composite trail image of the moving object with the pixels of subsequent images having luminance larger than the previous composite trail image of the moving object.

For example, a first starry sky image has been shot. In this case, the first starry sky image serves as a first composite trail image of the moving object. When shooting of a second image is completed, pixels at corresponding positions of the first starry sky image and the second starry sky image are compared. If the luminance of a pixel at a position of the second starry sky image is larger than the luminance of a pixel at the corresponding position in the first starry sky image, the pixel of the second starry sky image is extracted to replace the pixel at the corresponding position of the first starry sky image. A composited star trail image (i.e., a new trail image of the moving object) is finally obtained. Then, this composited star trail image serves as the previous composite trail image of the moving object, subsequently obtained starry sky images are processed in the same way. Thus, a target star trail image is finally obtained.

For another example, an image includes n pixel units, namely a pixel unit 1, a pixel unit 2, . . . , a pixel unit n. The luminance of 200 pixel units namely the pixel unit 501 to the pixel unit 700 in a shot current image is greater than the luminance of the previous composite trail image of the moving object. Pixels of the pixel unit 501 to the pixel unit 700 in the previous composite trail image of the moving object are replaced with pixels of the pixel unit 501 to the pixel unit 700 in a current image. A new composite image is obtained and serves as a new trail image of the moving object (i.e., new composite star trail image) after replacement is completed.

When a moving object is shot, the shot current trail image of the moving object is composited with the background image to generate a target image. For example, in case of nebula shooting, shooting is performed after a certain duration (i.e., first predetermined duration) of exposure, so as to obtain the nebula image. The certain duration is 120 s, preferably. That is, a nebular image is shot after exposure of 120 s.

In the present embodiment, a preset image is acquired and taken as a background image for image shooting, and when shooting is ended, the shot current trail image of the moving object is composited with the background image to generate a target image. An image can be selected as a shooting background image, diversified demands for shooting background images of images are met, and the experience of image shooting is improved.

Figure 2:
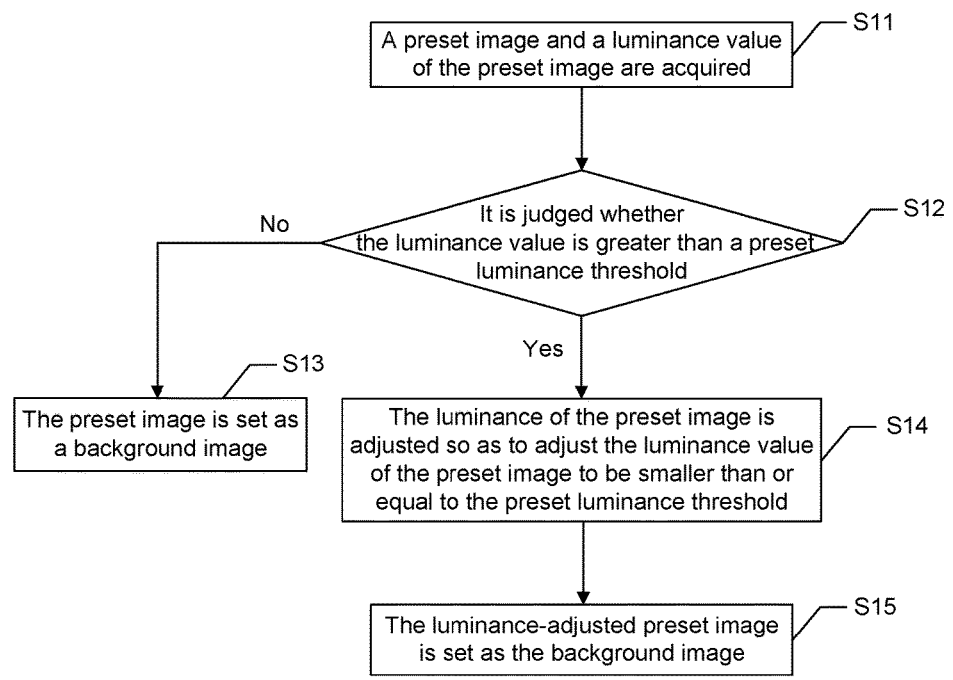
FIG. 2 is a flowchart of a second embodiment for an image composition method according to the disclosure.

Reference is made to FIG. 2 which is a flowchart of a second embodiment for an image composition method according to the disclosure. Based on the first embodiment for the image composition method, Step S10 includes the steps as follows.

In Step S11, a preset image and a luminance value of the preset image are acquired.

In Step S12, it is judged whether the luminance value is greater than a preset luminance threshold. If the luminance value is greater than a preset luminance threshold, Step S14 and Step S15 are performed, and if the luminance value is not greater than a preset luminance threshold, Step S13 is performed.

After the preset image is acquired, the luminance value of the preset image is acquired, and it is judged whether the luminance value is greater than the preset luminance threshold. The preset luminance threshold is set by a user in advance. For example, the maximum luminance is 100, so the preset luminance threshold may be set as 20 or 30, and the preset luminance threshold is set as a luminance at which a shot target in an image can be viewed. The process of acquiring the luminance value of the preset image may include: acquiring an average luminance value of the preset image. Alternatively, the process of acquiring the luminance value of the preset image may include: dividing the preset image into a plurality of areas according to the magnitude of the luminance value, acquiring average luminance value of each of the areas, and sequentially comparing the acquired luminance value with the preset luminance threshold, so as to judge whether the acquired luminance value is greater than the preset luminance threshold.

In Step S13, the preset image is set as a shooting background image.

The fact that the luminance value is smaller than or equal to the preset luminance threshold indicates that the shot target in the image can be clearly shot at the luminance value. It is unnecessary to adjust the luminance of the shooting background image, and the preset image is set as the shooting background image of the image.

In Step S14, the luminance of the preset image is adjusted so as to adjust the luminance value of the preset image to be smaller than or equal to the preset luminance threshold.

The luminance value of the preset image is decreased to be smaller than or equal to the preset luminance threshold.

In Step S15, the luminance-adjusted preset image is set as the shooting background image.

The fact that the luminance value of the preset image is greater than the preset luminance threshold indicates that the shot target cannot be clearly shot at the luminance. Therefore, it is necessary to adjust the luminance of the preset image, and the luminance of the preset image is adjusted so as to adjust the luminance value of the preset image to be smaller than or equal to the preset luminance threshold. For example, if the preset luminance threshold is 30, the luminance value of the preset image is adjusted to be smaller than or equal to 30. The luminance-adjusted preset image is set as the shooting background image. That is, the preset image having luminance smaller than or equal to the preset luminance threshold serves as the shooting background image of the image.

According to the embodiment of the disclosure, in a process of setting a shooting background image, a luminance value of a preset image to be set as a background image is acquired, and when the luminance value is greater than a preset luminance threshold, the luminance of the preset image is adjusted so as to adjust the luminance value of the preset image to be smaller than or equal to the preset luminance value, such that a shot target can be clearly shot in the background image, thereby improving the experience of image shooting.

Figure 3:
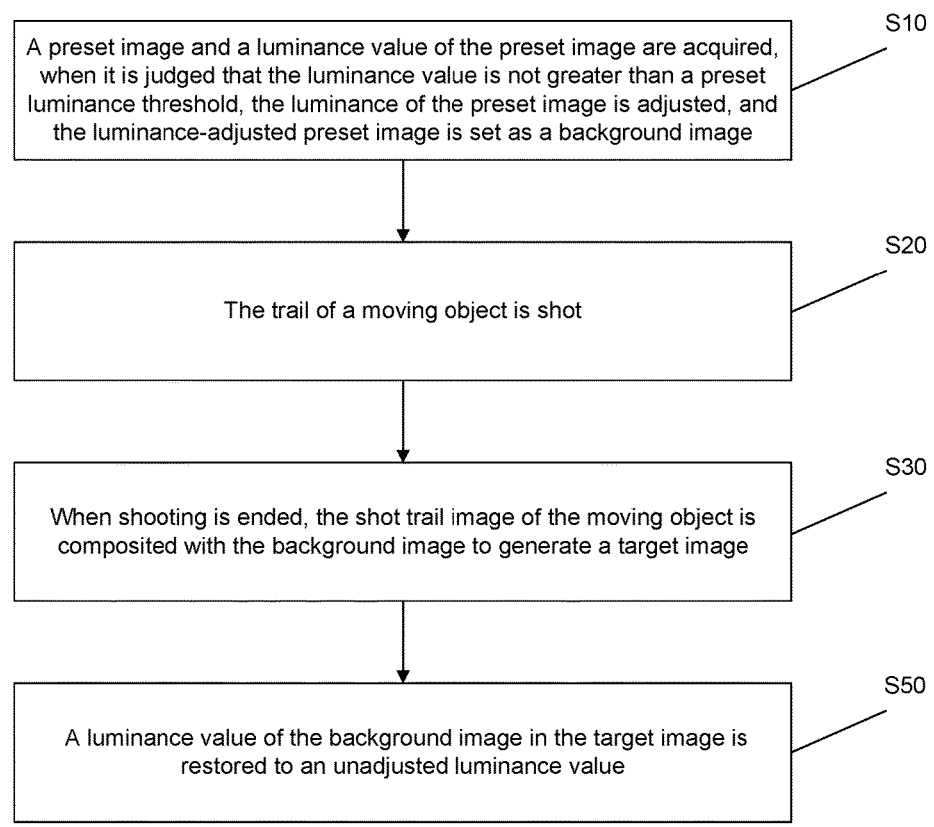
FIG. 3 is a flowchart of a third embodiment for an image composition method according to the disclosure.

Reference is made to FIG. 3 which is a flowchart of a third embodiment for an image composition method according to the disclosure. Based on the second embodiment for the image composition method, the luminance of the preset image is adjusted, and the method further includes the steps as follows after Step S30.

In Step S50, a luminance value of the background image in the target image is restored to an unadjusted luminance value.

After the luminance value of the preset image is adjusted, that is, after the luminance value of the preset image is adjusted to be smaller than or equal to the preset luminance threshold, the shot trail image of the moving object and the background image are composited to generate a target image, and the luminance value of the background image in the target image is restored to the unadjusted luminance value. If an overall average luminance value of the background image is adjusted, the overall average luminance value of the background image is restored to the unadjusted luminance value. If the background image is divided into different areas and luminance values are adjusted respectively, a luminance value of each of the areas of the background image is restored to a corresponding unadjusted luminance value. In other embodiments of the disclosure, for better viewing the shot target in the target image, a background image luminance value in the composite target image may be acquired after the composite target image is obtained. When the acquired luminance value is smaller than an expected threshold (the luminance value is 50, 60 or the like), the luminance of the background image is adjusted, such that the luminance value of the background image in the target image reaches the expected threshold. Alternatively, the luminance value of the target image is acquired, and when the acquired luminance value is smaller than the expected threshold, the luminance of the target image is adjusted to be greater than or equal to the expected threshold. In the present embodiment, before image shooting, the luminance of the background image is adjusted. And after the composite target image is obtained, the luminance of the background image is restored to the unadjusted luminance, such that the user can better view the shot target in the composited image, thereby improving the experience of image shooting, and improving the user experience.

Figure 4:
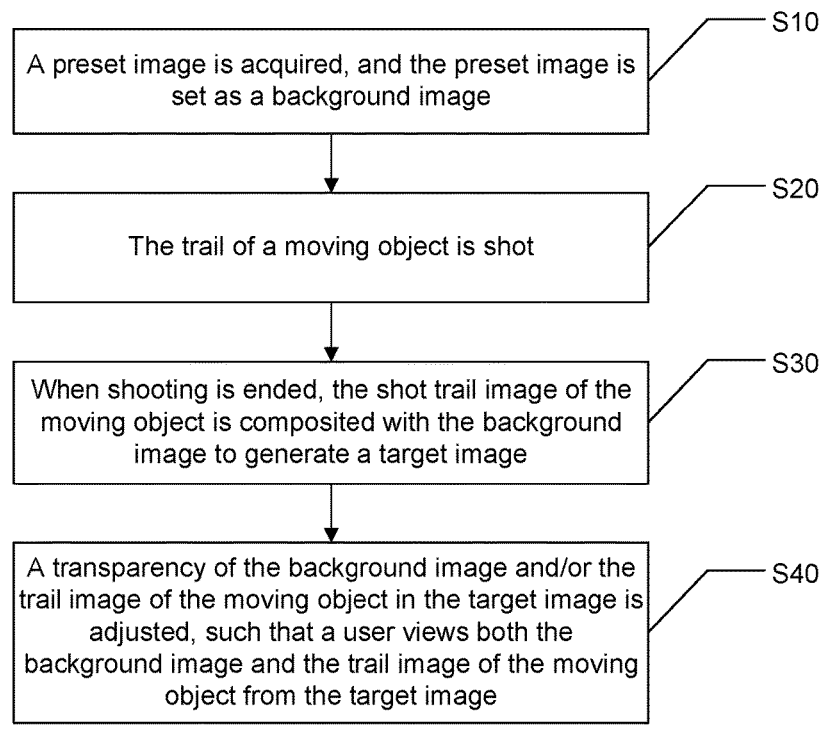
FIG. 4 is a flowchart of a fourth embodiment for an image composition method according to the disclosure.

Reference is made to FIG. 4 which is a flowchart of a fourth embodiment for an image composition method according to the disclosure. Based on the third embodiment for the image composition method, the method further includes the steps as follows after Step S30.

In Step S40, a transparency of the background image and/or a transparency of the trail image of the moving object in the target image is adjusted, such that a user views both the background image and the trail image of the moving object in the target image.

In the present embodiment, after the target image is composited, it is judged whether both the background image and the trail image of the moving object can be viewed in the target image. If both the background image and the trail image of the moving object can be viewed in the target image, it is unnecessary to adjust the transparency of the target image; and otherwise, a transparency of the background image and/or a transparency of the trail image of the moving object in the target image is adjusted. That is, the transparency of the background image may be adjusted separately, or the transparency of the trail image of the moving object may be adjusted separately, or both the transparency of the background image and the transparency of the trail image of the moving object are adjusted. For example, the transparency of the background image and the transparency of the trail image of the moving object are adjusted to 50% respectively, so the user may view both the background image and the trail image of the moving object in the target image. That is, the background image will not cover the trail image of the moving object, and the trail image of the moving object will not cover the background image. In the present embodiment, when it is impossible to view both the background image and the trail image of the moving object in the target image, the transparency of the target image is adjusted, such that both the background image and the trail image of the moving object can be viewed, thereby effectively avoiding the problem that it is impossible to view both a background image and a shot target. As such, the experience of image shooting is improved, and the user experience is also improved.

An embodiment of the disclosure also provides a computer storage medium having stored therein computer executable instructions for executing the above image composition method.

An embodiment of the disclosure further provides an image composition apparatus.

Figure 5:
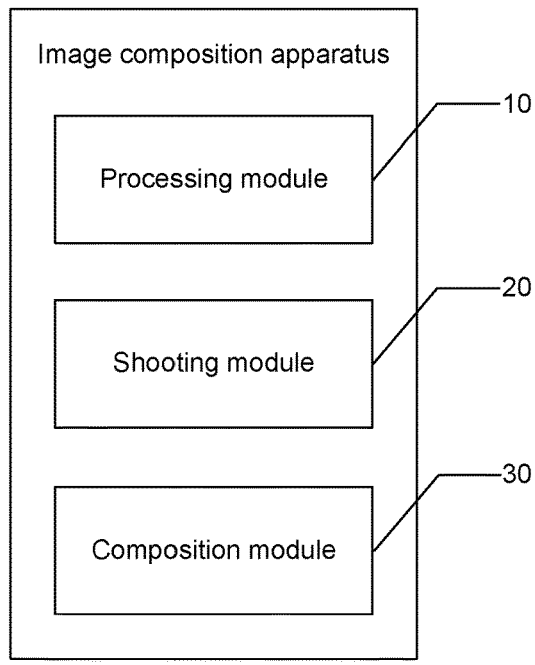
FIG. 5 is a schematic view of functional modules of a first embodiment for an image composition apparatus according to the disclosure.

Reference is made to FIG. 5 which is a schematic view of functional modules of a first embodiment for an image composition apparatus according to the disclosure.

In one embodiment, the image composition apparatus includes a processing module 10, a shooting module 20 and a composition module 30.

The processing module 10 is configured to acquire a preset image, and set the preset image as a shooting background image.

In the present embodiment, when an image shooting instruction is received or before an image is shot, the preset image is acquired. The process of acquiring the preset image may include: receiving an image input instruction, and taking an image corresponding to the image input instruction as the preset image. Alternatively, the process of acquiring the preset image may include: receiving an image selection instruction, and selecting a corresponding image from pre-stored images according to a selection instruction. The corresponding image is taken as the preset image. Alternatively, the process of acquiring the preset image may include: receiving an image acquisition instruction, randomly selecting, as the preset image, an image from the pre-stored images, or selecting, as the preset image, an image meeting a preset selection condition from the pre-stored images. The preset selection condition refers to that the view count of the pre-stored images exceeds a preset view count threshold (for example, 3, 5 or the like), or an interval between storage time of the pre-stored images and current time is smaller than a preset time threshold (for example, one day, 20 hours or the like). The preset images may be image-processed images, for example, figures and/or scenes extracted from an image, or may be unprocessed original images such as images from which figures and/or scenes are not extracted. After the preset image is acquired, the preset image is set as a shooting background image. In other embodiments of the disclosure, in order to make image shooting better meet expectations of people, a preset image may be acquired, figures and/or scenes are extracted from the preset image, and the extracted figures and/or scenes serve as a shooting background image.

The shooting module 20 is configured to shoot the trail of a moving object.

The composition module 30 is configured to composite, when shooting is ended, the shot current trail image of the moving object with the background image to generate a target image.

During shooting of the moving object, when a first image is shot, the first image is taken as a first composite trail image of the moving object. After the first image is shot, an image is shot at a preset time interval, and every time the image is shot, the shot current image is composited with a previous composite trail image of the moving object so as to generate a new trail image of the moving object. When shooting is ended, the shot trail image of the moving object is composited with the background image to generate a target image.

After the preset image is set as the shooting background image, immediately or after a certain time interval (30s, one minute or the like), or when the image shooting instruction is received, the first image is shot. When the first image is shot, the first image is taken as the composited first trail image of the moving object. Before the image is shot, the position of an image shooting apparatus may be adjusted, in order to allow a shot target in the shot image to be located at an expected position of the background image. In other embodiments of the disclosure, in order to enable a user to better view each image, the background image may be composited with the corresponding shot trail image of the moving object, thereby improving the user experience.

After the first image is shot, an image is shot at a preset time interval. And every time the image is shot, the shot current image is composited with a previous composite trail image of the moving object so as to generate a new trail image of the moving object. That is, when the first image is shot, the first image is taken as the composited first trail image of the moving object. After a preset time interval, a second image is shot. When the second image is shot, the second image is composited with the first image so as to generate a new trail image of the moving object. After a preset time interval, a third image is shot. When the third image is shot, the third image is composited with the composited second trail image of the moving object so as to generate a new trail image of the moving object. In such way, an image composited at each time is taken as a new trail image of the moving object, such that when next image is shot, the image composited at each time is composited with a next image to generate the new trail image of the moving object. The preset time is exposure time, namely exposure time required for image shooting, for example, 120 s, 200 s or the like.

The target image is formed by combining the trails of identical shot targets in images shot at different moments. When an image shooting ending instruction is received, or when preset shooting time (two hours, four hours or the like) is up, image shooting stops. When shooting is ended, the shot current trail image of the moving object and the background image are acquired, and the acquired shot current trail image of the moving object and the background image are composited to generate a target image. That is, the shot current trail image of the moving object and the background image are composited, so as to display the trail image of the moving object on the background image.

For example, in the case of composition of a light-painting image, the process of compositing the shot current trail image of the moving object with the previous composite trail image of the moving object so as to generate the new trail image of the moving object may include: performing an addition operation on the shot current trail image of the moving object and the previous composite trail image of the moving object to generate the new trail image of the moving object, that is, superposing pixels in the previous composite trail image of the moving object and pixels in a shot current starry sky image to generate a composited light-painting image. Since image data is collected at a preset exposure time interval, composite images are discontinuously generated.

Preferably, a set of pixels meeting a preset condition are selected from the previous composite trail image of the moving object and a set of pixels meeting a preset condition are selected from the shot current starry sky image, and then an addition operation is performed on the two sets of pixels.

Specifically, in some embodiments, when judging whether a certain pixel meets the preset condition, it may be directly judged whether a luminance parameter of the pixel is greater than a threshold, and if the luminance parameter of the pixel is greater than the threshold, it is judged that the pixel meets the preset condition. After the set of the pixels having luminance parameters greater than the threshold (that is, an absolute value of the luminance of a certain point on an image is greater than the threshold) are selected from the previous composite trail image of the moving object and the set of the pixels having luminance parameters greater than the threshold are selected from the shot current starry sky image, an addition operation is performed only on the two sets of pixels meeting the preset condition, thereby filtering pixels having lower luminance to a certain extent, and preventing a final composite light-painting image from being polluted by an accumulation effect of ambient light. The amplitude of the threshold may be determined according to the average luminance of the image, and the luminance parameter is an optical parameter such as an RGB value, a YUV value or the like.

For example, the image includes n pixel units, namely a pixel unit 1, a pixel unit 2, . . . , a pixel unit n. Pixel parameters of the pixel unit 101 to the pixel unit 200 in the previous composite trail image of the moving object are greater than the threshold, and luminance parameters of the pixel unit 1 to the pixel unit 100 in the shot current starry image are greater than the threshold. Thus, an addition operation is performed on pixel parameters of the pixel unit 1 to the pixel unit 200 in the previous composite trail image of the moving object and pixel parameters of the pixel unit 1 to the pixel unit 200 in the shot current starry sky image. It is assumed that the luminance parameter value of the pixel unit 1 in a current image to be composited is 10 and the luminance parameter value of the pixel 1 in the shot current starry sky image is 100, the luminance parameter value of the pixel unit 1 in a composite light-painting image (i.e., a new trail image of the moving object) after addition will be 100+10=110. Besides, noise reduction is performed on the composite light-painting image, and a composition proportion of a new composite light-painting image is controlled according to the exposure of the existing image, thereby inhibiting over-exposure.

For example, in the case of composition of a target star trail image, the process of compositing the shot current trail image of the moving object with the previous composite trail image of the moving object so as to generate the new trail image of the moving object may include: acquiring pixels at the same position and at different time, judging whether the luminance of a pixel in the shot current trail image of the moving object is greater than the luminance of a pixel in the previous composite trail image of the moving object, and if the shot current trail image of the moving object is greater than the luminance of a pixel in the previous composite trail image of the moving object, replacing the pixel in the previous composite trail image of the moving object with a pixel in the shot current starry sky image. After all of the pixels having smaller luminance in the previous composite trail image of the moving object are replaced, a new star trail image is finally composited. That is, the star trail image composition of the present embodiment is performed in a luminance selection mode. An image of a star trail that has been composited serves as the previous composite trail image of the moving object, and a composition method is selected for replacing pixels in the previous composite trail image of the moving object with the pixels of subsequent images having luminance larger than the previous composite trail image of the moving object.

For example, a first starry sky image has been shot. In this case, the first starry sky image serves as a first composite trail image of the moving object. When shooting of a second image is completed, pixels at corresponding positions of the first starry sky image and the second starry sky image are compared. If the luminance of a pixel at a position of the second starry sky image is larger than the luminance of a pixel at the corresponding position in the first starry sky image, the pixel of the second starry sky image is extracted to replace the pixel at the corresponding position of the first starry sky image. A composited star trail image (i.e., a new trail image of the moving object) is finally obtained. Then, this composited star trail image serves as the previous composite trail image of the moving object, subsequently obtained starry sky images are processed in the same way. A target star trail image is finally obtained.

For another example, an image includes n pixel units, namely a pixel unit 1, a pixel unit 2, ..., a pixel unit n. The luminance of 200 pixel units namely the pixel unit 501 to the pixel unit 700 in a shot current image is greater than the luminance of the previous composite trail image of the moving object. Pixels of the pixel unit 501 to the pixel unit 700 in the previous composite trail image of the moving object are replaced with pixels of the pixel unit 501 to the pixel unit 700 in a current image. A new composite image is obtained and serves as a new trail image of the moving object (i.e., new composite star trail image) after replacement is completed.

When a moving object is shot, the shot current trail image of the moving object is composited with the background image to generate a target image. For example, in the case of nebula shooting, shooting is performed after a certain duration of exposure, so as to obtain the nebula image. The certain duration is 120 s, preferably. That is, a nebular image is shot after exposure of 120 s.

In the present embodiment, a preset image is acquired and taken as a background image for image shooting. When shooting is ended, the shot current trail image of the moving object is composited with the background image to generate a target image. An image can be selected as a shooting background image, diversified demands for shooting background images of images are met, and the experience of image shooting is improved.

Figure 6:
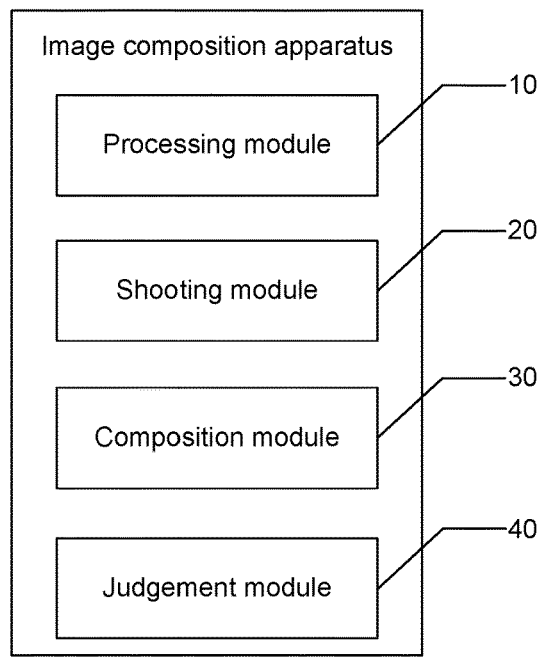
FIG. 6 is a schematic view of functional modules of a second embodiment for an image composition apparatus according to the disclosure.

Reference is made to FIG. 6 which is a schematic view of functional modules of a second embodiment for an image composition apparatus according to the disclosure. The image composition apparatus further includes a judgement module 40.

The processing module 10 is further configured to acquire a luminance value of the preset image.

The judgement module 40 is configured to judge whether the luminance value is greater than a preset luminance threshold.

After the preset image is acquired, the luminance value of the preset image is acquired, and it is judged whether the luminance value is greater than the preset luminance threshold. The preset luminance threshold is set by a user in advance. For example, the maximum luminance is 100, so the preset luminance threshold may be set as 20 or 30, and the preset luminance threshold is set as a luminance at which a shot target in an image can be be viewed. The process of acquiring the luminance value of the preset image may include: acquiring an average luminance value of the preset image. Alternatively, the process of acquiring the luminance value of the preset image may include: dividing the preset image into several areas according to the amplitude of the luminance value, acquiring average luminance value of each of the areas, and sequentially comparing the acquired luminance value with the preset luminance threshold, so as to judge whether the acquired luminance value is greater than the preset luminance threshold.

The processing module 10 is further configured to set, when the luminance value is smaller than or equal to the preset luminance threshold, the preset image as a shooting background image.

The fact that the luminance value is smaller than or equal to the preset luminance threshold indicates that the shot target in the image can be clearly shot at the luminance value. It is unnecessary to adjust the luminance of the shooting background image, and the preset image is set as the shooting background image of the image.

The processing module 10 is further configured to adjust, when the luminance value of the preset image is greater than the preset luminance threshold, the luminance of the preset image so as to adjust the luminance value of the preset image to be smaller than or equal to the preset luminance threshold, and set the luminance-adjusted preset image as the shooting background image.

The fact that the luminance value of the preset image is greater than the preset luminance threshold indicates that the shot target cannot be clearly shot at the luminance. Therefore, it is necessary to adjust the luminance of the preset image, and the luminance of the preset image is adjusted so as to adjust the luminance value of the preset image to be smaller than or equal to the preset luminance threshold. For example, if the preset luminance threshold is 30, the luminance value of the preset image is adjusted to be smaller than or equal to 30. The luminance-adjusted preset image is set as the shooting background image. That is, the preset image having luminance smaller than or equal to the preset luminance threshold serves as the shooting background image of the image.

According to the embodiment of the disclosure, in a process of setting a shooting background image, a luminance value of a preset image to be set as a background image is acquired. When the luminance value is greater than a preset luminance threshold, the luminance of the preset image is adjusted so as to adjust the luminance value of the preset image to be smaller than or equal to the preset luminance value, such that a shot target can be clearly shot in the background image, thereby improving the experience of image shooting.

In a preferred solution, the composition module 30 is further configured to composite the shot trail image of the moving object with the background image to generate a target image.

The processing module 10 is further configured to restore a luminance value of the background image in the target image to an unadjusted luminance value.

After the luminance value of the preset image is adjusted, that is, after the luminance value of the preset image is adjusted to be smaller than or equal to the preset luminance threshold, the shot trail image of the moving object and the background image are composited to generate a target image, and the luminance value of the background image in the target image is restored to the unadjusted luminance value. If an overall average luminance value of the background image is adjusted, the overall average luminance value of the background image is restored to the unadjusted luminance value. If the background image is divided into different areas and luminance values are adjusted respectively, a luminance value of each area of the background image is restored to a corresponding unadjusted luminance value. In other embodiments of the disclosure, for better viewing the shot target in the target image, a background image luminance value in the target image may be acquired after the composite target image is obtained. When the acquired luminance value is smaller than an expected threshold (the luminance value is 50, 60 or the like), the luminance of the background image is adjusted, such that the luminance value of the background image in the target image reaches the expected threshold. Alternatively, the luminance value of the target image is acquired, and when the acquired luminance value is smaller than the expected threshold, the luminance of the target image is adjusted to be greater than or equal to the expected threshold. In the present embodiment, before image shooting, the luminance of the background image is adjusted, and after the composite target image is obtained, the luminance of the background image is restored to the unadjusted luminance, such that the user can better view a running trail of the shot target in the composited image, thereby improving the experience of image shooting, and improving the user experience.

In a preferred solution, the processing module 10 is further configured to adjust a transparency of the background image and/or a transparency of the current image to be composited in the target image, such that a user views both the background image and the current image to be composited in the target image.

In the present embodiment, after the target image is composited, it is judged whether both the background image and the trail image of the moving object can be viewed in the target image. If both the background image and the trail image of the moving object can be viewed in the target image, it is unnecessary to adjust the transparency of the target image. Otherwise, a transparency of the background image and/or a transparency of the trail image of the moving object in the target image is adjusted, that is, the transparency of the background image may be adjusted separately, or the transparency of the trail image of the moving object may be adjusted separately, or both the transparency of the background image and the transparency of the trail image of the moving object are adjusted. For example, the transparency of the background image and the transparency of the trail image of the moving object are adjusted to 50% respectively, so the user may view both the background image and the trail image of the moving object in the target image. That is, the background image will not cover the trail image of the moving object, and the trail image of the moving object will not cover the background image. In the present embodiment, when both the background image and the trail image of the moving object cannot be viewed in the target image, the transparency of the target image is adjusted, such that both the background image and the trail image of the moving object can be viewed, thereby effectively avoiding the problem that it is impossible to view both a background image and a shot target, improving the experience of image shooting, and improving the user experience.

In practical application, the processing module 10, the shooting module 20, the composition module 30 and the judgement module 40 may be implemented by a Central Processing Unit (CPU), a Digital Signal Processor (DSP), a Micro Processor Unit (MPU), a Field Programmable Gate Array (FPGA) or the like.

The above is only the preferred embodiments of the disclosure and does not limit the patent scope of the disclosure accordingly. Equivalent structure or equivalent flow transformations made by utilizing the description and drawings of the disclosure or direct or indirect applications to other relevant technical fields can fall within the patent protection scope of the disclosure in the same way.

Those skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage medium (including, but are not limited to, a disk memory, an optical memory and the like) containing computer available program codes may be adopted in the disclosure.

The disclosure is described with reference to flow charts and/or block diagrams of the method, the device (system) and the computer program product according to the embodiments of the disclosure. It will be appreciated that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to create a machine, such that an apparatus for implementing functions designated in one or more flows of the flow charts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is created via the instructions stored in the computer readable memory, and the instruction apparatus implements the functions designated in one or more flows of the flow charts and/or one or more blocks of the block diagrams.

These computer program instructions may also be loaded to the computers or the other programmable data processing devices, such that processing implemented by the computers is generated by performing a series of operation steps on the computers or the other programmable devices, and therefore the instructions executed on the computers or the other programmable devices provide a step of implementing the functions designated in one or more flows of the flow charts and/or one or more blocks of the block diagrams.

The above is only the preferred embodiments of the disclosure and is not intended to limit the protective scope of the disclosure.

What is claimed is:

1. An image composition method, comprising:
acquiring a preset image, and setting the preset image as a background image;
shooting a moving object to obtain a shot trail image; and
compositing, when shooting is ended, the shot trail image of the moving object with the background image to generate a target image;
wherein setting the preset image as the background image comprises:
acquiring a luminance value of the preset image, and judging whether the luminance value is greater than a preset luminance threshold;
setting, when the luminance value is smaller than or equal to the preset luminance threshold, the preset image as the background image;
adjusting, when the luminance value of the preset image is greater than the preset luminance threshold, the luminance of the preset image so as to adjust the luminance value of the preset image to be smaller than or equal to the preset luminance threshold; and
setting the luminance-adjusted preset image as the background image.

2. The image composition method according to claim 1, wherein shooting the moving object to obtain the shot trail image comprises:
taking, when a first image is shot, the first image as a first composite trail image of the moving object;
shooting, after the first image is shot, an image at a preset time interval, and compositing, every time the image is shot, a shot current image with a previous composite trail image of the moving object so as to generate a new trail image of the moving object; and
when shooting is ended, obtaining the shot trail image of the moving object.

3. The image composition method according to claim 1, wherein after compositing the shot trail image of the moving object with the background image to generate the target image, the method further comprises:
adjusting at least one of a transparency of the background image or a transparency of the shot trail image of the moving object in the target image.

4. The image composition method according to claim 2, wherein when the shot image is an image of a star trail, compositing the shot current image with the previous composite trail image of the moving object so as to generate the new trail image of the moving object comprises:
determining whether a luminance of a pixel in the shot current image of the moving object is greater than the luminance of a pixel, which is at a same position as the position of the pixel of the shot current image, in the previous composite trail image of the moving object; and
if the luminance of the pixel in the shot current image of the moving object is greater than the luminance of the pixel, which is at the same position as the position of the pixel in the shot current image, in the previous composite trail image of the moving object, replacing the pixel in the previous composite trail image of the moving object with the pixel, which is at the same position as the position of the pixel in the previous composite trail image, in the shot current image of the moving object.

5. The image composition method according to claim 2, wherein when the shot image is a light-painting image, compositing the shot current image with the previous composite trail image of the moving object so as to generate the new trail image of the moving object comprises:
performing an addition operation on the shot current image of the moving object and the previous composite trail image of the moving object to generate the new trail image of the moving object.

6. The image composition method according to claim 1, wherein when the shot image is a nebula image,
shooting is performed after a certain duration of exposure, so as to obtain the nebula image.

7. An image composition apparatus, comprising:
one or more processors executing computer readable instructions for a plurality of modules comprising:
a processing module, configured to acquire a preset image, and set the preset image as a background image;
a shooting module, configured to shoot a moving object to obtain a shot trail image; and
a composition module, configured to composite, when shooting is ended, the shot trail image of the moving object with the background image to generate a target image;
wherein the processing module is further configured to acquire a luminance value of the preset image;
the one or more processors further execute computer readable instructions to implement a judgement module, the judgement module is configured to judge whether the luminance value is greater than a preset luminance threshold;
the processing module is further configured to set, when the luminance value is smaller than or equal to the preset luminance threshold, the preset image as the background image; and
the processing module is further configured to adjust, when the luminance value of the preset image is greater than the preset luminance threshold, the luminance of the preset image so as to adjust the luminance value of the preset image to be smaller than or equal to the preset luminance threshold, and set the luminance-adjusted preset image as the background image.

8. The image composition apparatus according to claim 7, wherein the processing module is further configured to take, when a first image is shot, the first image as a first composite trail image of the moving object;
the shooting module is further configured to shoot, after the first image is shot, an image at a preset time interval; and
the composition module is configured to composite, every time the image is shot, a shot current image with a previous composite trail image of the moving object so as to generate a new trail image of the moving object, and when shooting is ended, obtain the shot trail image of the moving object.

9. The image composition apparatus according to claim 8, wherein the processing module is further configured to adjust at least one of a transparency of the background image or a transparency of the shot trail image of the moving object in the target image.

10. The image composition apparatus according to claim 8, wherein when the shot image is an image of a star trail, the judgement module is further configured to judge whether a luminance of a pixel in the shot current image of the moving object is greater than the luminance of a pixel, which is at a same position as the position of the pixel in the shot current image, in the previous composite trail image of the moving object; and
the composition module is further configured to replace, when it is judged by the judgement module that the luminance of the pixel in the shot current image of the moving object is greater than the luminance of the pixel, which is at the same position as the position of the pixel in the shot current image, in the previous composite trail image of the moving object, the pixel in the previous composite trail image of the moving object with the pixel, which is at the same position as the position of the pixel in the previous composite trail image, in the shot current image of the moving object.

11. The image composition apparatus according to claim 8, wherein
when the shot image is a light-painting image, the composition module is further configured to perform an addition operation on the shot current image of the moving object and the previous composite trail image of the moving object to generate the new trail image of the moving object.

12. A non-transitory computer-readable storage medium having stored computer executable instructions for executing the image composition method according to claim 1.

13. The image composition method according to claim 1, wherein compositing the shot trail image of the moving object with the background image to generate the target image comprises adjusting a luminance value of the background image.

14. The image composition method according to claim 13, wherein after the shot trail image of the moving object is composited with the background image to generate the target image, the method further comprises:
restoring the luminance value of the background image in the target image to an unadjusted luminance value.

15. The image composition apparatus according to claim 8, wherein the composition module is further configured to adjusting a luminance value of the background image.

16. The image composition apparatus according to claim 15, wherein the processing module is further configured to restore the luminance value of the background image in the target image to an unadjusted luminance value.

17. The image composition method according to claim 2, wherein setting the preset image as the shooting background image comprises:
acquiring a luminance value of the preset image, and judging whether the luminance value is greater than a preset luminance threshold; and
setting, when the luminance value is smaller than or equal to the preset luminance threshold, the preset image as the background image.

* * * * *